No. 882,341. PATENTED MAR. 17, 1908.
C. L. PEPPER.
METHOD OF CURING OR VULCANIZING RUBBER GOODS.
APPLICATION FILED SEPT. 15, 1906.
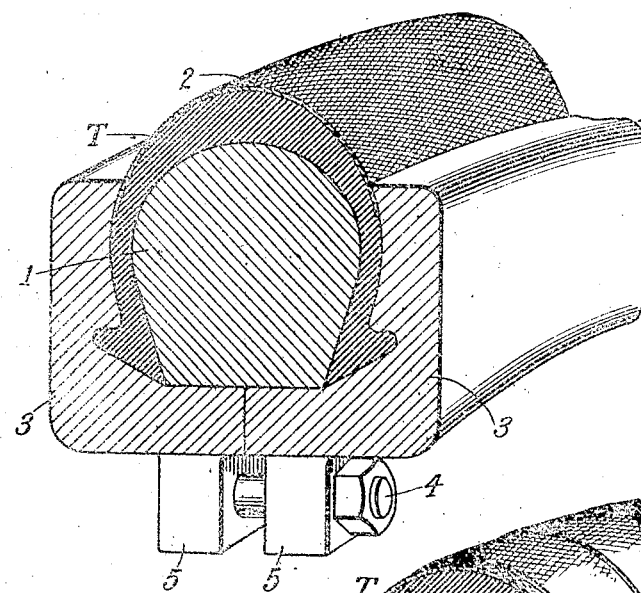
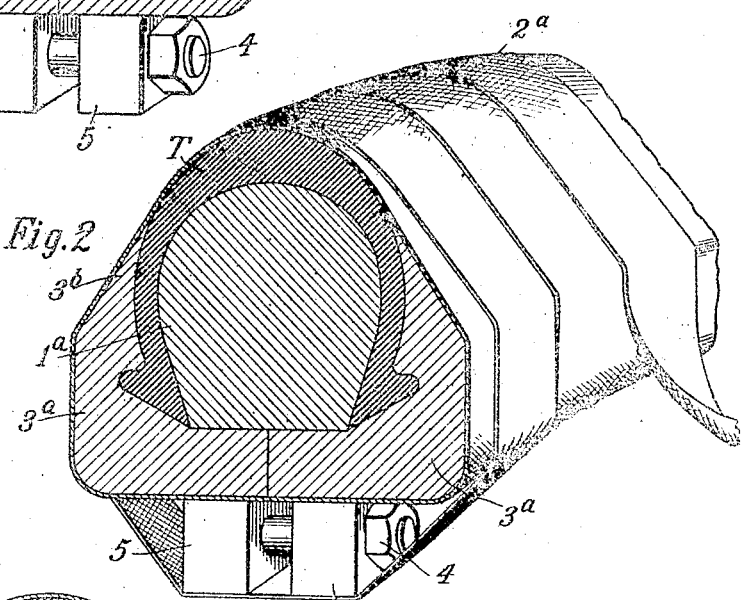
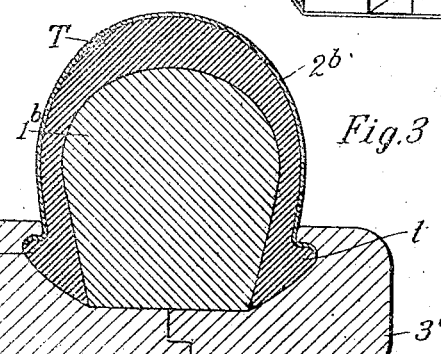
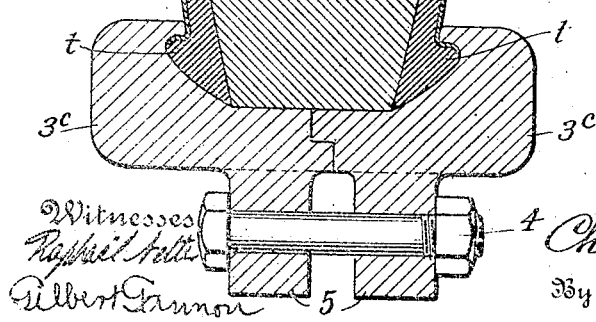
Witnesses  Charles L. Pepper Inventor
By his Attorney Baxter Morton

UNITED STATES PATENT OFFICE.

CHARLES L. PEPPER, OF INDIANAPOLIS, INDIANA.

METHOD OF CURING OR VULCANIZING RUBBER GOODS.

No. 882,341. Specification of Letters Patent. Patented March 17, 1908.

Application filed September 15, 1906. Serial No. 334,791.

*To all whom it may concern:*

Be it known that I, CHARLES L. PEPPER, a citizen of the United States, residing in Indianapolis, Marion county, Indiana, have invented a new and useful Improvement in Methods of Curing or Vulcanizing Rubber Goods, of which the following is a specification.

This invention relates to methods of curing or vulcanizing rubber goods, and particularly to the vulcanization of the outer shoes or casings for pneumatic tires.

The primary object of the invention is to provide an improved method of vulcanizing molded rubber goods by the direct action of heated gas or vapor, preferably steam, without danger of distortion of the goods during the vulcanization process; and a special object of the invention as it relates to the vulcanization of the outer shoes or casings for pneumatic tires is to provide for the complete vulcanization of a tire shoe or casing by means of a single exposure of the tire shoe or casing to the action of the heated gas or vapor.

Owing to the peculiar structure of the shoes or casings for pneumatic tires, the ordinary procedure heretofore in the vulcanization of such tire shoes or casings has been to place the unvulcanized tire shoe upon a core or form and inclose the tire shoe so supported in a mold which is then subjected to heat and pressure. This procedure is not entirely satisfactory as the rubber vulcanized in this way is not so well adapted to withstand wear as rubber which is cured or vulcanized in an "open heat" by the direct action of steam or some other heated gas or vapor. In order to secure the increased durability which characterizes rubber vulcanized in an "open heat" the practice has arisen of first vulcanizing a carcass for a tire shoe in a mold, then cementing on the exterior of this vulcanized carcass a tread of unvulcanized rubber, and the tire with its supporting core is then provided with a porous wrapping of textile fabric and subjected to the action of steam or other heated gas or vapor in an open heat to effect the vulcanization of the tread. The results of this method are not entirely satisfactory because portions of the tire are apt to become "over cured" by being exposed twice to the vulcanizing heat and when the other portions of the tire are not over cured by this method the tread is apt to be only partially cured and not adapted to withstand the wear to which it is subjected.

In carrying out my invention I make use of a core upon which the tire shoe or casing is supported, suitable clamping rings for securing the marginal portions of the tire in position and a porous covering for the tread portion of the tire. These elements are illustrated in three slightly different forms in the accompanying drawings forming part of this specification, in which corresponding parts are designated by similar characters of reference in the several views.

In the drawings: Figure 1 is a sectional perspective view of a portion of one form of apparatus employed, showing a section of tire suitably held by the apparatus and ready for vulcanization. Fig. 2 is a sectional perspective view similar to Fig. 1 but showing a slightly different form of apparatus. Fig. 3 is a small transverse sectional view showing a third form of apparatus with the tire secured in position thereby.

Stated in general terms the method which forms the present invention consists simply in supporting the unvulcanized tire shoe or casing in form, applying a porous covering of textile fabric or its equivalent over the tread portion of the tire shoe or casing and exposing the tire so supported and covered to the action of heated gas or vapor in a suitable vulcanizing chamber. When apparatus of the character illustrated in Fig. 1 is employed the unvulcanized tire shoe T is mounted on the core 1 which is of annular form and may be collapsible or not, as desired. A covering 2 of textile fabric cut on the bias is applied circumferentially to the tread portion of the tire shoe or casing as shown, the bias fabric conforming readily to the shape of the tire and lying in close contact therewith. Clamping members 3 are applied to hold the tire shoe in form upon the core and to hold the marginal portions of the porous covering 2 in position upon the tread of the tire shoe. These clamping members 3 are preferably annular, though they may be made in section if desired, and are secured in engagement with the tire by any suitable means, as by means of transverse bolts 4 extending through lugs 5 provided on the clamping members for that purpose.

The apparatus illustrated in Fig. 2 differs from that shown in Fig. 1 in having the cover for the tread of the tire applied after the clamping members are brought into engagement with the tire shoe and core. In this figure the tire shoe is first mounted on a core, then clamping members 3ª are employed to secure the tire shoe in position. These clamping members are beveled on their outer surfaces so as to taper sharply toward their outer edges and present surfaces 3ᵇ which are substantially tangential to the tread of the tire shoe. After the clamping members 3ª are secured in position by means of clamping bolts 4 or the like, a covering 2ª is applied to the tread of the tire shoe which is exposed between the outer edges of the clamping members 3ª. This covering 2ª consists simply of a long strip of bias fabric which is wound around the tire shoe and the clamping members 3ª in overlapping whorls or turns substantially transverse to the tread of the tire shoe.

The apparatus illustrated in Fig. 3 very closely resembles that shown in Fig. 1, from which it differs simply in the amount of the outer surface of the tire shoe which is covered by the porous covering. The tire shoe having been mounted on the core, a covering 2ᵇ is applied over the tread and side portions of the tire show, this covering being formed of fabric cut bias and wound circumferentially around the tire shoe, but being of such width that it extends downward upon the sides adjacent to the edges of the shoe. In a tire of the "clencher" type illustrated in the drawings the covering 2ᵇ is preferably extended downward on to the clencher edges or beads t upon which it is secured by means of clamping members 3ᶜ which extend beyond the clencher edges or beads only to a sufficient distance to secure the tire shoe firmly upon the core 1.

When apparatus of any one of the three forms above described and illustrated in the drawings is employed, the tire suitably clamped and provided over its tread, and, perhaps over the side portions as well, is introduced into a vulcanizing chamber and there subjected to the action of the heated gas or vapor. Steam under pressure is generally regarded as the best medium for transmitting the heat and this penetrates the porous covering of textile fabric so that the rubber of the tread portion of the tire is exposed to its direct action. After exposure to the action of steam or any other heated gaseous medium for a sufficient length of time the tire is removed from the vulcanizing chamber, the supporting and clamping members are disengaged, and the covering over the tread is removed, the tire being then completed, vulcanized or cured after being subjected only once to the action of heat.

The mode of constructing the tire shoe or casing forms no part of the present invention, but it will be obvious that when the tire shoe is to be cured according to this invention the entire shoe is constructed of raw uncured stock and the tread applied at the time of construction. The tire is then vulcanized as an entirety in a single operation, thus obviating the necessity of first vulcanizing the carcass and then vulcanizing the tread portion subsequently.

Having thus described my invention, what I claim as new and desire to secure by Letters Patents is:

1. The method of vulcanizing or curing the outer shoes or casings for pneumatic tires for vehicles, which consists in supporting and securing the shoe or casing in form, applying a porous cover to the exposed surface of the shoe or casing, and subjecting the shoe or casing so supported and covered to the action of vulcanizing heat.

2. The method of vulcanizing or curing the outer sheaths or casings for pneumatic tires for vehicles which consists in supporting the shoe or casing upon a core, clamping the shoe or casing in position on the core with the tread portion exposed, placing a porous covering over the exposed surfaces of the tire shoe or casing and in contact therewith, and subjecting the shoe or casing so supported, clamped and covered to the action of vulcanizing heat.

In testimony whereof, I have signed my name in the presence of two witnesses.

CHARLES L. PEPPER.

Witnesses:
C. H. SEMPLE,
G. H. HAMILTON.